(12) United States Patent
Blalock

(10) Patent No.: US 6,497,313 B1
(45) Date of Patent: Dec. 24, 2002

(54) POWER TAKE-OFF UNIT WITH AUTOMATICALLY ACTUATED DRAG BRAKE

(75) Inventor: James H. Blalock, Olive Branch, MS (US)

(73) Assignee: Parker Hannifin Corporation, Cleveland, OH (US)

( * ) Notice: Subject to any disclaimer, the term of this patent is extended or adjusted under 35 U.S.C. 154(b) by 34 days.

(21) Appl. No.: 09/819,577

(22) Filed: Mar. 28, 2001

(51) Int. Cl.[7] .............................................. F16D 11/06
(52) U.S. Cl. ..................................................... 192/18 A
(58) Field of Search ................................ 192/18 A, 86, 192/87.18, 58.92; 207/161, 162; 188/151 R

(56) References Cited

U.S. PATENT DOCUMENTS

| | | |
|---|---|---|
| 3,669,229 A | 6/1972 | Ronayne et al. |
| 3,872,954 A | 3/1975 | Nordstrom et al. |
| 4,860,862 A * | 8/1989 | Yater et al. ............ 192/113.23 |
| 5,070,982 A | 12/1991 | Pitchford |
| 5,415,257 A | 5/1995 | Shimamura et al. |
| 5,437,355 A | 8/1995 | Takagi et al. |
| 5,542,306 A * | 8/1996 | Fernandez ............... 188/264 E |
| 5,806,641 A * | 9/1998 | Sommer .................... 192/18 A |

* cited by examiner

Primary Examiner—Jack Lavinder
Assistant Examiner—C. T. Bartz
(74) Attorney, Agent, or Firm—MacMillan, Sobanski & Todd, LLC

(57) ABSTRACT

A power take-off unit includes a drag brake assembly that is automatically engaged when a hydraulically actuated clutch assembly is disengaged. The drag brake assembly includes a brake piston that is axially aligned with the output shaft and is urged into frictional engagement therewith by a spring. When pressurized fluid is provided, the clutch assembly is engaged to cause the output shaft to be rotatably driven by the input gear. At the same time, the pressurized fluid causes the brake piston to retract axially within the cylindrical recess against the urging of the spring. As a result, the brake piston is moved out of frictional engagement with the output shaft to permit free rotation of the output shaft. When pressurized fluid is not provided, the clutch assembly is disengaged to prevent the output shaft from being rotatably driven by the input gear. The lack of pressurized fluid in the clutch chamber to allows the spring disposed within the cylindrical recess to urge the brake piston axially into frictional engagement with the output shaft to retard rotation thereof.

12 Claims, 2 Drawing Sheets

POWER TAKE-OFF UNIT WITH AUTOMATICALLY ACTUATED DRAG BRAKE

BACKGROUND OF THE INVENTION

This invention relates in general to a power take-off unit including a hydraulically or pneumatically actuated clutch assembly for selectively driving an accessory from a source of rotational power, such as a vehicle engine or transmission. More specifically, this invention relates to an improved structure for a power take-off unit including a drag brake assembly that is automatically engaged when the clutch assembly is disengaged, and further that is automatically disengaged when the clutch assembly is engaged.

Power take-off units are well known mechanical devices that are commonly used in conjunction with sources of rotational power, such as vehicle engines and transmissions, for rotatably driving a driven accessory. For example, power take-off units are commonly used in a variety of industrial and agricultural vehicles for operating hydraulic pumps that, in turn, operate hydraulically driven devices, such as plows, trash compactors, lifting mechanisms, winches, and the like. A typical power take-off unit includes a housing that rotatably supports an input gear (which is rotatably driven by the vehicle engine), an output shaft (which is connected to the driven device), and a set of meshing intermediate gears. The meshing intermediate gears are connected in a gear train between input gear and the output shaft so as to provide a rotatable driving connection between the engine of the vehicle and the driven accessory. The set of intermediate gears permits one or more speed reduction gear ratios to be provided between the input gear and the output shaft.

In many instances, the power take-off unit further includes a clutch assembly for selectively disconnecting the output shaft from the input gear. The use of a clutch assembly in a power take-off unit is desirable because it permits selective or intermittent operation of the driven accessory without having to turn off the vehicle engine. When the clutch assembly is engaged, the output shaft is rotatably driven by the input gear. Consequently, the driven device is operated by the vehicle engine. Conversely, when the clutch assembly is disengaged, the output shaft is not rotatably driven by the input gear. As a result, the driven device is not operated by the vehicle engine.

During operation, the meshing of the various gears contained within the housing of the power take-off unit can generate significant amounts of undesirable friction and heat. To minimize the adverse effects of this friction and heat, it is common to provide a quantity of lubricating fluid within the housing of the power take-off unit. When the input gear of the power take-off unit is connected to a vehicle transmission, for example, the lubricating fluid may be the transmission lubricating fluid. The teeth of the various gears contained within the housing of the power take-off unit are moved through the lubricating fluid during operation to minimize the adverse effects of friction and heat.

As mentioned above, when the clutch assembly is disengaged, the output shaft is not rotatably driven by the input gear, and the driven device is not operated by the vehicle engine. In this disengaged condition, the output shaft is simply disconnected from the input gear and is allowed to free-wheel within the housing of the power take-off unit. Under most conditions, the combination of being disconnected from the source of rotational power with the inherent resistance to further movement imposed by the load of the driven device causes the output shaft to immediately cease further rotation until the clutch assembly is subsequently re-engaged. Unfortunately, it has been found that under certain circumstances, the relatively viscous nature of the lubricating fluid can cause the output shaft to continue to be at least partially rotatably driven, even though the clutch assembly has been disengaged. This undesirable rotation of the output shaft after disengagement of the clutch assembly can, for example, occur when the temperature of the lubricating fluid is relatively cold and viscous, such as when the vehicle is initially started. Obviously, rotation of the output shaft of the power take-off unit (and, thus, operation of the driven device) after the clutch assembly has been disengaged is undesirable.

To address this, it is known to provide a power take-off unit with a brake system to slow or stop rotation of the output shaft. In one known power take-off unit, an internal drag brake assembly constantly applies a braking force to the output shaft to retard rotation thereof, regardless of whether the clutch assembly of the power take-off unit clutch is engaged for operation or disengaged for non-operation. This constantly-braked power take-off structure is undesirable because it requires frequent adjustments to insure that the proper amount of braking force is applied to the output shaft. This is because the various components of the brake assembly will wear during use, thus varying the amount of the braking force. Also, wear and heat occur rapidly and frequently within the power take-off unit, resulting in frequent maintenance and repair. Furthermore, the magnitude of the braking force which can be exerted is limited so as to not adversely affect the operation of the power take-off unit when the clutch assembly is engaged for normal use.

In another known power take-off unit, a braking member is mechanically actuated by the clutch assembly of the power take-off unit. In this mechanically actuated power take-off structure, a clutch piston of the clutch assembly is urged toward a disengaged position by a spring. To engage the clutch assembly, fluid (hydraulic or pneumatic, for example) is applied to move the clutch piston against the urging of the spring to an engaged position. The braking member is connected to the clutch piston through a mechanical linkage. Thus, when the clutch piston is in the disengaged position, the braking member is in the engaged position. Conversely, when the clutch piston is in the engaged position, the braking member is in the disengaged position. This mechanically actuated brake assembly structure has been found to be undesirable because the brake assembly cannot be operated independent of the clutch assembly. Rather, operation of the brake assembly is reliant on the successful operation of the clutch assembly. Thus, it would be desirable to provide an improved structure for a power take-off unit including an internal brake assembly which avoids the drawbacks of these known structures.

SUMMARY OF THE INVENTION

This invention relates to an improved structure for a power take-off unit including a drag brake assembly that is automatically engaged when a clutch assembly is disengaged, and further that is automatically disengaged when the clutch assembly is engaged. The power take-off unit includes a housing that contains an input gear and an output shaft. The input gear is adapted to be connected to an engine or transmission of a vehicle or other source of rotational power so as to be rotatably driven in a conventional manner. The output shaft is adapted to be connected to rotatably driven accessory, such as a hydraulic pump. The power take-off unit includes a clutch assembly for selectively providing a driving connection between the input gear and the output shaft. The drag brake assembly is provided for automatically exerting a braking force against the output shaft to retard rotation thereof when the clutch assembly is disengaged. The drag brake assembly includes a brake piston that is disposed within a cylindrical recess formed in a bearing cap secured to the housing of the power take-off unit. The brake piston is axially aligned with the output shaft and is urged into frictional engagement therewith by a spring disposed within the cylindrical recess. When pressurized fluid is provided from a source to a clutch chamber, the clutch assembly is engaged to cause the output shaft to be rotatably driven by the input gear. At the same time, the pressurized fluid causes the brake piston to retract axially within the cylindrical recess against the urging of the spring. As a result, the brake piston is moved out of frictional engagement with the output shaft to permit free rotation of the output shaft. When pressurized fluid is not provided from the source to the clutch chamber, the clutch assembly is disengaged to prevent the output shaft from being rotatably driven by the input gear. The lack of pressurized fluid in the clutch chamber to allows the spring disposed within the cylindrical recess to urge the brake piston axially into frictional engagement with the output shaft to retard rotation thereof.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
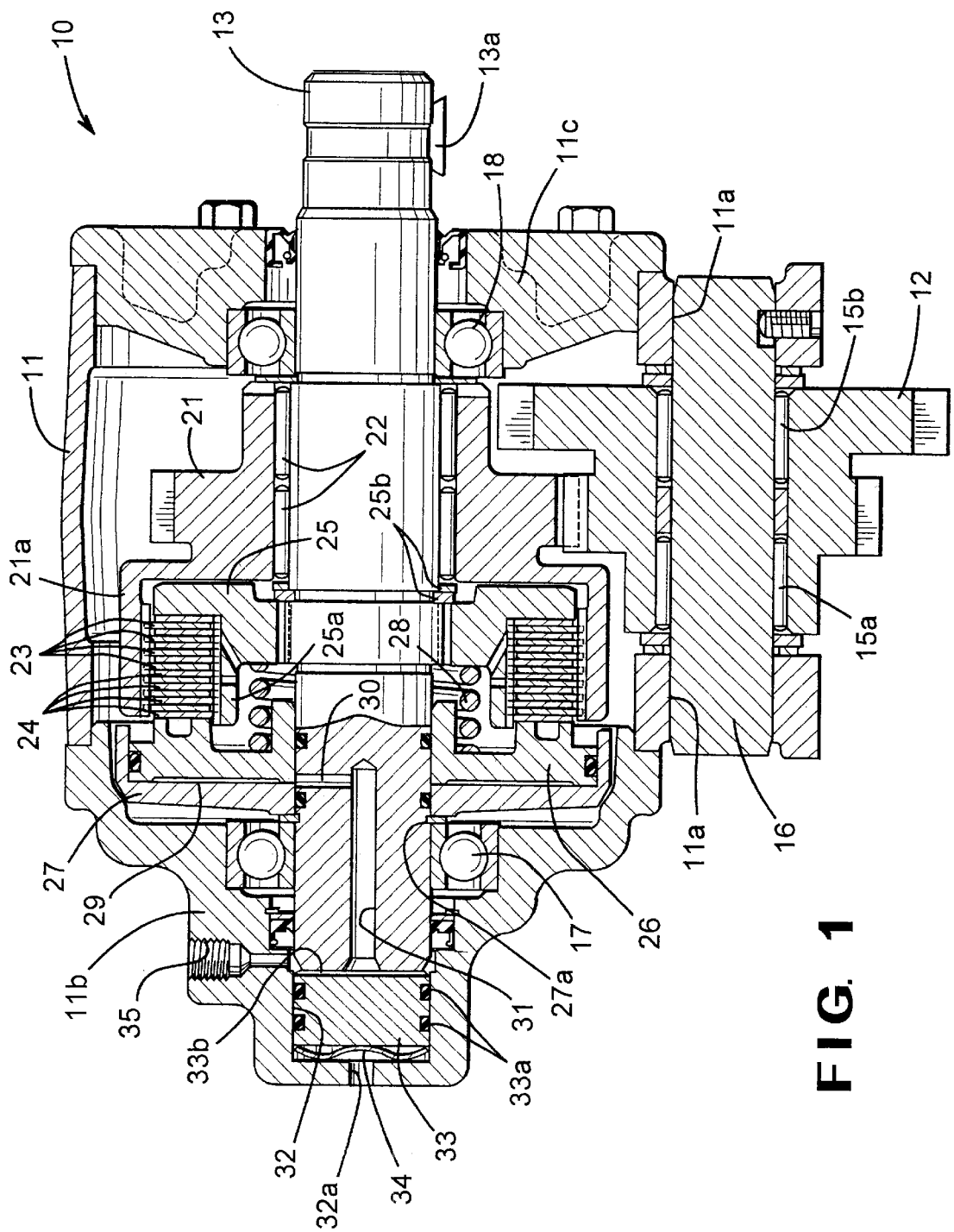
FIG. 1 is a sectional elevational view of a power take-off unit in accordance with this invention, wherein the clutch assembly is disengaged and the drag brake assembly is engaged.

Referring now to the drawings, there is illustrated in FIG. 1 a power take-off unit, indicated generally at 10, in accordance with this invention. The basic structure and mode of operation of the power take-off unit 10 are well known in the art, and only those portions of the power take-off unit 10 which are necessary for a complete understanding of the invention will be described. The power take-off unit 10 includes a rigid housing 11 that contains an input gear 12 and an output shaft 13. The input gear 12 is adapted to be connected to an engine or transmission (not shown) of a vehicle or other source of rotational power so as to be rotatably driven in a conventional manner. The output shaft 13 is adapted to be connected to rotatably driven accessory (not shown), such as a hydraulic pump. The illustrated output shaft 13 is cylindrical in shape and is provided with a conventional key 13a for facilitating a rotatable driving connection with the driven accessory.

The input gear 12 is supported by a pair of roller bearings 15a and 15b for rotation on a non-rotatable idler shaft 16 contained within the housing 11 of the power take-off unit 10. The ends of the idler shaft 16 are supported within respective openings 11a formed through the housing 11 of the power take-off unit 10. One end of the output shaft 13 (the left end when viewing FIG. 1) is rotatably supported by a first conventional annular bearing 17 provided within a recess formed in a first bearing cap 11b secured to the housing 11 of the power take-off unit 10. The other end of the output shaft 13 (the right end when viewing FIG. 1) is rotatably supported by a second conventional annular bearing 18 provided within a recess formed in a second bearing cap 11c secured to the housing 11 of the power take-off unit 10.

The power take-off unit 10 includes a clutch assembly for selectively providing a driving connection between the input gear 12 and the output shaft 13. The clutch assembly includes a drive gear 21 that meshes with the input gear 12. The drive gear 21 is rotatably supported on the output shaft 13 by a plurality of conventional needle bearings 22. The drive gear 21 includes an axially-extending hollow cylindrical bell portion 21a having a splined inner surface. A plurality of flat annular clutch plates 23 is splined to the inner splined surface of the hollow cylindrical bell portion 21a of the drive gear 21 for rotation therewith. Thus, the drive gear 21 and the clutch plates 23 are constantly rotatably driven by the input gear 12.

A plurality of annular friction plates 24 is disposed in alternating fashion between the clutch plates 23. The friction plates 24 are splined to an outer splined surface provided on an axially extending cylindrical portion 25a of a clutch gear 25 for rotation therewith. The clutch gear 25 is splined or otherwise secured to the output shaft 13 for rotation therewith. Thus, the friction plates 24, the clutch gear 25, and the output shaft 13 are connected for rotation together as a unit. The clutch gear 25 is restrained from axial movement in one direction (toward the right when viewing FIG. 1) by one or more retaining rings 25b that are mounted on the output shaft 13, for a purpose which will be explained below.

The clutch plates 23 and the friction plates 24 form a portion of a clutch assembly for the power take-off unit 10. An annular clutch piston 26 is provided for selectively causing the clutch plates 23 and the friction plates 24 to frictionally engage one another so as to engage the clutch assembly. To accomplish this, the clutch piston 26 is disposed within a hollow cylindrical clutch cylinder 27. The clutch cylinder 27 has a closed end and an opened end. One end of the clutch piston 26 (the left end when viewing FIG. 1) is disposed within the clutch cylinder 27, while the opposite end of the clutch piston 26 (the right end when viewing FIG. 1) extends from the opened end of the clutch cylinder 27 adjacent to the clutch plates 23 and friction plates 24. Both the clutch piston 26 and the clutch cylinder 27 are supported on the output shaft 13. The clutch piston 26 is axially movable along the output shaft 13, but the clutch cylinder 27 is restrained from axial movement in one direction (toward the left when viewing FIG. 1) by one or more retaining rings 27a that are mounted on the output shaft 13, for a purpose which will be explained below.

A coiled clutch spring 28 reacts between the clutch piston 26 and the clutch gear 25. As discussed above, the clutch gear 25 is restrained from axial movement in one direction (toward the right when viewing FIG. 1) by the retaining rings 25b. Thus, the clutch spring 28 urges the clutch piston 26 axially in the opposite direction (toward the left when viewing FIG. 1) toward a disengaged position adjacent to the closed end of the clutch cylinder 27. In the disengaged position, the clutch piston 26 does not engage the clutch plates 23 and the friction plates 24. Thus, the clutch plates 23 and the friction plates 24 do not frictionally engage one another. As a result, the clutch gear 25 is disconnected from the drive gear 21 so as to provide no rotatable driving connection therebetween.

An annular clutch chamber 29 is defined between the clutch piston 26 and the closed end of the clutch cylinder 27. This annular clutch chamber 29 communicates through a transverse passageway 30 and an axial passageway 31 formed through the output shaft 13 with a brake chamber 32 formed within a portion of the first bearing cap 11b of the power take-off unit 10. In the illustrated embodiment, the axial passageway 31 extends through to the axial end of the output shaft 13, and the axial end of the output shaft 13 is extends within the brake chamber 32, although such is not necessary. A brake piston 33 is disposed within the brake chamber 32. In the illustrated embodiment, the brake piston 33 is co-axially aligned with the axial end of the output shaft 13, although such is not necessary. One or more annular seals 33a may be provided about the brake piston 33 to provide a fluid-tight seal against the inner surface of the brake chamber 32. If desired, the axial end of the brake piston 33 that is disposed adjacent to the axial end of the output shaft 13 may be provided with a layer or coating 33b of a friction material. The friction material may be formed from any suitable material, such as HM-200-E friction material that is commercially available from HydraMechanica Corp. of Sterling Heights, Mich., for example. The purpose for this layer 33b of the friction material will be explained below.

Figure 2:
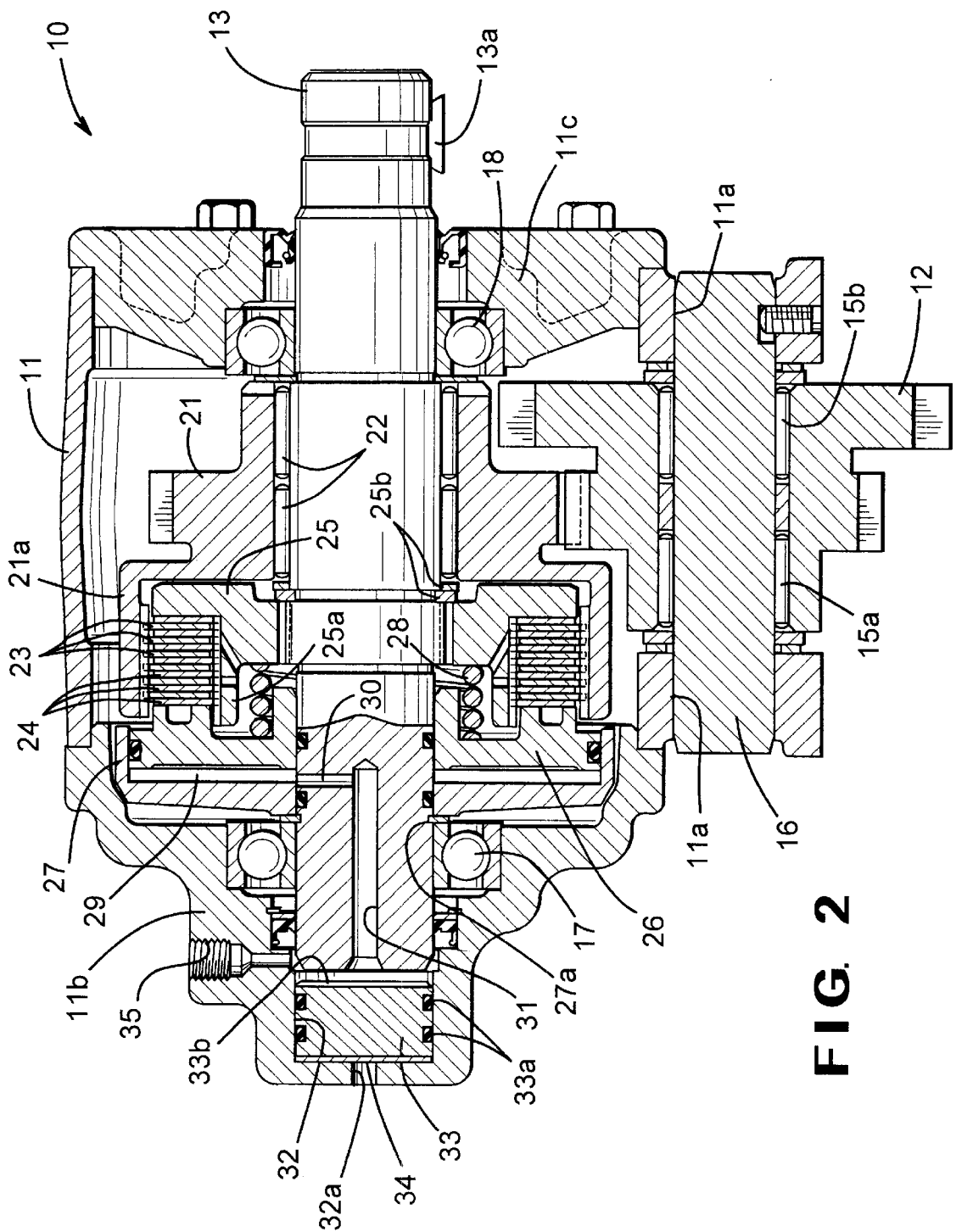
FIG. 2 is a sectional elevational view similar to FIG. 1, wherein the clutch assembly is engaged and the drag brake assembly is disengaged.

The brake piston 33 is adapted to move axially within the brake chamber 32 between an engaged position illustrated in FIG. 1, wherein the layer 33b of the friction material on the brake piston 33 engages the axial end of the output shaft 13, and a disengaged position illustrated in FIG. 2, wherein the layer 33b of the friction material on the brake piston 33 does not engage the axial end of the output shaft 13. To facilitate such axial movement, a vent hole 32a may be formed from the interior of the brake chamber 32 through the second bearing cap 11b to the atmosphere. The vent holes 32a can be provided to prevent any vacuum from occurring within the brake chamber 32 as a result of the axial reciprocating movement of the brake piston 33. Such vacuum could inhibit the free axial movement of the brake piston 33.

A biasing structure is provided to urge the brake piston 33 into engagement with the axial end of the output shaft 13. In the illustrated embodiment, the biasing structure is a wave spring 34 that reacts between an inner surface of the brake chamber 32 and the brake piston 33. However, the biasing structure may be embodied as any structure, mechanical or otherwise, that can urge the brake piston 33 into engagement with any portion of the output shaft 13. Lastly, a pressure port 35 is formed through the second bearing cap 11b of the power take-off unit 10 and communicates with the brake chamber 32. The pressure port 35 is adapted to be connected to a source of pressurized fluid (not shown) in a conventional manner so as to selectively provide pressurized fluid (hydraulic or pneumatic) to the brake chamber 32 and, by virtue of the passageways 30 and 31, to the clutch chamber 29.

The overall operation of the power take-off unit 10 will now be described. When the engine of the vehicle is started, the input gear 12 is driven to rotate. Rotation of the input gear 12 causes the drive gear 21 to freely rotate around the output shaft 13. Assuming that the source of pressurized fluid has not been turned on, there is no pressurized fluid in any of the brake chamber 32, the passageways 30 and 31, and the clutch chamber 29. Therefore, the clutch assembly is maintained in its normally disengaged position under the influence of the clutch spring 28. As mentioned above, the clutch spring 28 moves the clutch piston 26 within the clutch cylinder 27 (toward the left when viewing FIG. 1) and away from the clutch plates 23 and friction plates 24. Thus, the clutch plates 23 and 24 do not frictionally engage one another, and the output shaft 13 is not rotatably driven by the input gear 12. At the same time, the brake piston 33 is urged into its normally engaged position under the influence of the wave spring 34. As mentioned above, the wave spring 34 urges the brake piston 33 into frictional engagement with the axial end of the output shaft 13 (toward the right when viewing FIG. 1). Thus, the output shaft 13 is affirmatively prevented from rotating.

When it is desired to engage the power take-off unit 10 to operate a driven device, the source of pressurized fluid is actuated to supply pressurized fluid through the pressure port 35 to the brake chamber 32, the passageways 30 and 31, and the clutch chamber 29. When this occurs, the increased fluid pressure within the annular clutch chamber 29 overcomes the force exerted by the clutch spring 28 and moves the clutch piston 26 axially into engagement with the friction plates 24 and clutch plates 23. Thus, the clutch piston 26 functions as a hydraulic actuator for the clutch assembly. As a result of this frictional engagement, the clutch gear 25 and the output shaft 13 are caused to rotate with the drive gear 21. Simultaneously, the fluid pressure within the brake chamber 32 overcomes the force exerted by the wave spring 34 and moves the brake piston 33 axially out of frictional engagement with the axial end of the output shaft 13 (toward the left when viewing FIG. 1). Thus, the output shaft 13 is free to be rotatably driven by the input gear 12.

In the illustrated embodiment, the brake piston 33 is not positively fixed to the second bearing cap 11b secured to the power take-off unit 10. Rather, the brake piston 33 is only frictionally engaged with the second bearing cap 11b by means of the annular seals 33a. Thus, when the brake piston 33 is moved into engagement with the axial end of the output shaft 13 as described above, it is possible that rotation of the output shaft 13 may cause a limited amount of rotational movement of the brake piston 33 before both are braked to a halt as a result of the frictional engagement of the annular seals 33a. Such rotational movement is typically relatively small and will not, under normal circumstances, be undesirable. However, if it is desired to prevent any rotation of the brake piston 33 so as to more positively brake the rotation of the output shaft 13, then this invention contemplates that the brake piston 33 can be positively restrained from rotating relative to the second bearing cap 11b of the power take-off unit 10. Such a positive restraint can be accomplished by providing a structure (not shown), such as a key or a spline, that engages both the brake piston 33 and the second bearing cap 11b to prevent relative rotation from occurring.

Because the brake chamber 32 and the clutch chamber 29 communicate with one another through the passageways 30 and 31, it will be appreciated that both of the annular chambers 29 and 32 will be pressurized simultaneously when pressurized fluid is supplied through the pressure port 35. Assuming that the spring forces exerted by the clutch spring 28 and the wave spring 34 are approximately the same, the clutch piston 26 and the brake piston 33 will be simultaneously actuated. However, the spring forces exerted by the clutch spring 28 and the wave spring 34 need not be the same, and may alternatively be different to provide for sequential actuation of the clutch piston 26 and the brake piston 33. Alternatively, the passageways 30 and 31 may be sized to cause the pressure within the brake chamber 32 and the clutch chamber 29 to change at different rates for sequential operation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off unit comprising:

an input gear;

an output shaft;

a clutch assembly connected between said input gear and said output shaft, said clutch assembly being operable in either an engaged condition, wherein said input gear is connected to drive said output shaft, or a disengaged condition, wherein said input gear is not connected to drive said output shaft, said clutch assembly being responsive to the application of pressurized fluid for being operated in said engaged condition;

a brake assembly being operable in either an engaged condition, wherein said brake assembly retards rotation of said output shaft, or a disengaged condition, wherein said brake assembly does not retard rotation of said output shaft, said brake assembly being responsive to the application of pressurized fluid for being operated in said disengaged condition; and a conduit for selectively applying pressurized fluid simultaneously to both said clutch assembly and said brake assembly.

2. The power take-off unit defined in claim 1 wherein said clutch assembly is normally maintained in said disengaged condition.

3. The power take-off unit defined in claim 2 wherein said clutch assembly includes a spring that urges said clutch assembly to said disengaged condition.

4. The power take-off unit defined in claim 1 wherein said brake assembly is normally maintained in said engaged condition.

5. The power take-off unit defined in claim 4 wherein said brake assembly includes a spring that urges said brake assembly to said engaged condition.

6. The power take-off unit defined in claim 1 wherein said clutch assembly is normally maintained in said disengaged condition, and wherein said brake assembly is normally maintained in said engaged condition.

7. The power take-off unit defined in claim 6 wherein said clutch assembly includes a first spring that urges said clutch assembly to said disengaged condition, and wherein said brake assembly includes a second spring that urges said brake assembly to said engaged condition.

8. The power take-off unit defined in claim 1 wherein said brake assembly includes a brake piston that is movable between an engaged position, wherein said brake piston engages said output shaft to retard rotation thereof, and a disengaged position, wherein said brake piston does not engage said output shaft to retard rotation thereof.

9. The power take-off unit defined in claim 8 wherein said brake piston is co-axially aligned with said output shaft.

10. The power take-off unit defined in claim 8 wherein said brake piston has a layer of a friction material secured thereto that engages said output shaft when said brake piston is moved to said engaged position.

11. The power take-off unit defined in claim 8 wherein said brake assembly includes a spring for urging said brake piston to said engaged position.

12. The power take-off unit defined in claim 11 wherein said spring is a wave spring.

* * * * *